(12) United States Patent
Neumann (10) Patent No.: US 7,997,870 B2
(45) Date of Patent: Aug. 16, 2011

(54) TURBINE ROTOR FOR ELECTRICAL POWER GENERATION (75) Inventor: Joel G. Neumann, Palatine, IL (US)

(73) Assignee: B N Balance Energy Solutions, LLC, Palatine, IL (US)

( * ) Notice: Subject to any disclaimer, the term of this patent is extended or adjusted under 35 U.S.C. 154(b) by 1036 days.

(21) Appl. No.: 11/838,572

(22) Filed: Aug. 14, 2007

(65) Prior Publication Data
US 2009/0047131 A1 Feb. 19, 2009

(51) Int. Cl.
F03D 11/00 (2006.01)

(52) U.S. Cl. ........... 416/132 A; 416/132 B; 416/203; 416/240; 416/241 R (58) Field of Classification Search ............ 415/72, 415/75; 416/132 A, 132 B, 176, 203, 240, 416/241 R; 290/43, 44, 54, 55
See application file for complete search history.

(56) References Cited

U.S. PATENT DOCUMENTS

| | | | |
|---|---|---|---|
| 209,853 A * | 11/1878 | Benson | 416/15 |
| 328,593 A | 10/1885 | Main | 415/7 |
| 464,607 A | 12/1891 | Brown | |
| 507,294 A | 10/1893 | Vance | 417/405 |
| 532,493 A | 1/1895 | Swerintzeff-Kusminsky | |
| 625,614 A | 5/1899 | Thompson | |
| 868,798 A | 10/1907 | McLaughlin | |
| 996,309 A | 6/1911 | Carson | |
| 1,027,501 A | 5/1912 | Person | |
| 1,100,332 A | 6/1914 | Smith | |
| 1,105,846 A | 8/1914 | Schneider | |
| 1,123,491 A | 1/1915 | Corman | 290/54 |
| 1,147,658 A | 7/1915 | Stokes | 416/85 |
| 1,312,021 A | 8/1919 | Dickerson et al. | 290/55 |
| 1,342,206 A * | 6/1920 | Hansen-Ellehammer | 416/188 |
| 1,379,439 A | 5/1921 | Bott | |
| 1,420,665 A | 6/1922 | Newcombe | 55/408 |
| 1,504,259 A | 8/1924 | Miller | |
| 1,509,653 A | 9/1924 | Kaplan | |
| 1,790,969 A | 2/1931 | Bray | 416/189 |
| 1,903,545 A | 3/1931 | Hampton | 415/121.2 |
| 1,830,985 A | 11/1931 | Dreier | |
| 2,042,064 A | 5/1936 | Kugel | |
| 2,059,356 A | 11/1936 | James | |
| 2,089,876 A | 11/1937 | Nash | |
| 2,302,437 A * | 11/1942 | Frisbie | 416/221 |
| 2,689,680 A | 9/1954 | Lovesey | 415/26 |
| 3,033,441 A | 5/1962 | Coester | |

(Continued)

FOREIGN PATENT DOCUMENTS

GB 1508904 4/1978

OTHER PUBLICATIONS

International Search Report for PCT/US2008/066499 dated Sep. 9, 2008 (2p).

Primary Examiner — Ninh H Nguyen
(74) Attorney, Agent, or Firm — Brinks Hofer Gilson & Lione (57) ABSTRACT An electrical generation device includes a turbine rotor for electrical power generation, preferably underwater, from moving fluid, preferably water currents or the wind. The turbine rotor includes turbine blades that include flexible portions, preferably mounted at the edges of stiff portions of the turbine blades.

3 Claims, 8 Drawing Sheets

U.S. PATENT DOCUMENTS

| | | | |
|---|---|---|---|
| 3,112,610 A | 12/1963 | Jerger | 60/221 |
| 3,196,598 A | 7/1965 | Olson | 55/30.6 |
| 3,228,475 A * | 1/1966 | Worthmann | 416/188 |
| 3,531,214 A | 9/1970 | Abramson | 415/68 |
| 3,561,392 A | 2/1971 | Baez | |
| 3,610,775 A | 10/1971 | Swearingen | |
| 3,620,640 A | 11/1971 | Soulez-Lariviere | 415/126 |
| 3,680,977 A | 8/1972 | Rabouyt et al. | 415/172 |
| 3,758,231 A | 9/1973 | Barnstead | 416/132 |
| 3,818,696 A | 6/1974 | Beaufrere | 60/39.51 H |
| 3,822,103 A | 7/1974 | Hori et al. | 416/132 |
| 3,877,835 A | 4/1975 | Siptrott | 415/143 |
| 3,941,504 A | 3/1976 | Snarbach | |
| 3,986,787 A | 10/1976 | Mouton, Jr. et al. | |
| 4,012,163 A | 3/1977 | Baumgartner et al. | |
| 4,084,918 A | 4/1978 | Paulecka | |
| 4,086,026 A | 4/1978 | Tamanini | |
| 4,124,329 A | 11/1978 | Romanov et al. | |
| 4,187,055 A | 2/1980 | Barnstead | 416/132 |
| 4,205,943 A | 6/1980 | Vauthier | 416/86 |
| 4,218,175 A * | 8/1980 | Carpenter | 415/219.1 |
| 4,234,289 A | 11/1980 | Lebost | |
| 4,241,283 A | 12/1980 | Storer | 290/54 |
| 4,295,783 A | 10/1981 | Lebost | |
| 4,334,824 A | 6/1982 | Tsuchikawa et al. | 416/132 R |
| 4,335,319 A | 6/1982 | Mettersheimer | 290/54 |
| 4,524,285 A | 6/1985 | Rauch | 290/43 |
| 4,613,279 A | 9/1986 | Corren et al. | |
| 4,629,904 A | 12/1986 | Rojo, Jr. et al. | |
| 4,639,194 A | 1/1987 | Bell, III et al. | 416/241 B |
| 4,708,592 A | 11/1987 | Krolick et al. | |
| 4,722,665 A * | 2/1988 | Tyson | 416/84 |
| 4,849,647 A | 7/1989 | McKenzie | |
| 5,277,546 A | 1/1994 | Frey et al. | 415/202 |
| 5,451,137 A | 9/1995 | Gorlov | 415/7 |
| 5,577,882 A | 11/1996 | Istorik et al. | 415/53.1 |
| 5,905,311 A | 5/1999 | Hess | |
| 5,937,644 A | 8/1999 | Dipnall | 60/398 |
| 5,947,678 A | 9/1999 | Bergstein | |
| 6,132,172 A * | 10/2000 | Li | 416/11 |
| 6,135,716 A | 10/2000 | Billdal et al. | |
| 6,264,450 B1 | 7/2001 | Woodruff | 418/153 |
| 6,309,179 B1 | 10/2001 | Holden | 415/202 |
| 6,955,049 B2 | 10/2005 | Krouse | 60/641.7 |

* cited by examiner

TURBINE ROTOR FOR ELECTRICAL POWER GENERATION

BACKGROUND OF THE INVENTION

This invention is an electrical generation device. More particularly, it is a turbine rotor shape for electrical power generation, preferably underwater, from moving fluid, preferably water currents.

Currently, when there is a diminishing amount of fossil fuels and other limited resources, there is a need for reliable, renewable, "green" (ecologically sound) energy sources. These resources are needed to sustain the same comfort and productivity that we have enjoyed in the past. One such resource that has yet been underutilized is moving water. Rivers, tidal races, springs, lake currents and ocean currents are all potential sources of sustainable green power.

To capture the flow of waterpower in the past, one approach has been to erect an impoundment device (dam), and then place a turbine or water wheel at the base of the dam to drive a generator at the top of the dam. Numerous other devices were run by impounded or flowing water, such as overshot water wheels and undershot (breast) water wheels. Some of these use a raceway to speed up and confine the water to the area more suitable for blade contact to use the water's energy. All of these water generator systems have the same problem of unloading the energy-spent water in a manner such that it does not become a new source of resistance. Hence a place has to be made for the water to not impede the wheel or turbine rotor while increasing a backpressure (added friction). It is desirable for the blade or water-wheel cup to be as completely empty as possible, for its next filling of water charged with new kinetic energy to power the device.

Previous water-powered energy sources have blades are made of materials that have little or no flex (steel, wood, aluminum, brass, bronze, etc.). An inflexible blade or water-wheel cup may not completely unload its spent water. Therefore, controls are sometimes needed to limit the water inflow not to exceed a design parameter that could cause resistance, or in some cases, cavitations.

SUMMARY OF THE INVENTION

The present invention provides a turbine rotor with flexible blades or fins, for generating electrical power from moving fluid, such as water. These flexible blades can now absorb water flow or surge shock, and then spring back when the surge is decreased. With a flexible blade, the blade can change its own configuration with subtle changes in water velocity. The turbine rotor shape is also suitable for electrical power generation from the wind.

More specifically, the present invention provides a turbine rotor for electrical power generation from moving fluid, comprising:

(a) a turbine rotor base, having a central axis, an upstream end and a downstream end, the turbine rotor base having cross-sections in planes perpendicular to the central axis that are generally circular, the turbine rotor base having a major portion in which the cross-sections perpendicular to the central axis increase in size from the upstream end of the turbine rotor base to the downstream end of the turbine rotor base, the turbine rotor base further being rotatably mountable on an axial shaft; and (b) turbine blades that protrude from the sides of the base, the turbine blades including flexible portions.

DETAILED DESCRIPTION

Figure 1:
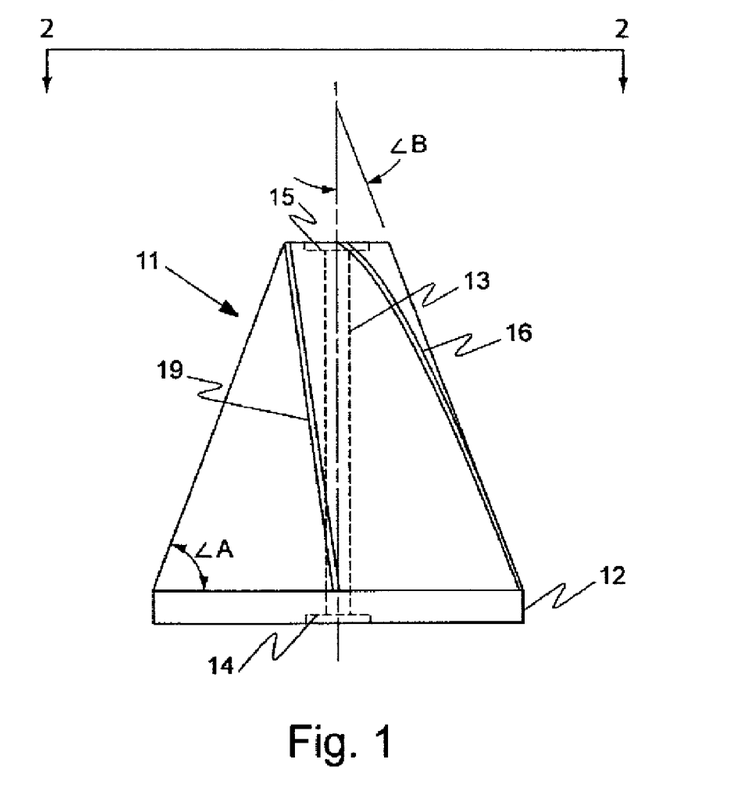
FIG. 1 is a right-side, left-side, front or back view of an example frustoconical base for a turbine rotor in accordance with the invention, as viewed from line 1-1 of FIG. 2.

The turbine rotor can comprise a turbine rotor base that includes a major portion having a frustoconical shape (e.g., base 11 in FIG. 1), and preferably a minor portion downstream of the major portion, which has a circular cylindrical shape (e.g., portion 12 in FIG. 1).

The turbine blades preferably have stiff portions (e.g., portion 28 in FIGS. 3 and 7) that protrude directly from the sides of the base, and to which the turbine blade flexible portions (e.g., portion 31 in FIGS. 3 and 7) are attached. The turbine blade stiff portions that protrude from the sides of the base preferably each have a shape that is wider at the upstream end of the turbine rotor base than at the downstream end of the turbine rotor base, and are preferably spaced approximately equally about the perimeter of the turbine rotor base. (Alternatively, the flexible portions can protrude directly from the sides of the base.) The turbine blade stiff portions, if present, preferably each have a shape that includes an approximately straight edge that is approximately equidistant from the axis of the turbine rotor base, to which the turbine blade flexible portions are attached.

The flexible blades can be made of long chain polymer plastics such as silicones and polyurethanes. The flexible blades can absorb flow/surge shock and then spring back when the surge is decreased. The flexible blade can change its configuration with subtle changes in water current or wind velocities. The flexible blades also facilitate capturing power from slower moving water.

The turbine rotor can be mounted on a main shaft on which is also mounted one or more electrical generators. According to one preference, the turbine rotor has an axial central bore therethrough (e.g., central bore 13 in FIG. 1) so that the turbine rotor can be mounted slideably on the main shaft. The turbine rotor can then be magnetically coupled to a gear mechanism which turns the shafts of three or four electrical generators positioned parallel to each other and surrounding the main shaft of the electrical generation device. The electrical output from the generators can then be used directly, or saved by charging batteries for later use. According to another preference, the turbine rotor is mounted securely on the main shaft, which is also coupled to a gear mechanism which turns the shafts of the electrical generators surrounding the main shaft.

The electrical generation device can be mounted permanently underwater to convert natural movement of water such as from river flow or tidal currents, into electrical current, as an environmentally sound method of power generation. Alternatively, it can be mounted on the underside of a boat such as a sailboat, rowboat, canoe or kayak to provide a source of electrical power in a vessel which may or may not otherwise have electrical power. In either context, multiple electrical generators, or multiple electrical generation devices according to the invention, can be connected electrically in parallel to provide greater amounts of electrical current as needed.

The turbine rotor has two structural components—a base and flexible turbine blades that protrude from the sides of the base. The base may be frustoconical, or have another shape such as conical, that of a smooth dome or hemisphere, or that of a pointed dome (similar to the nose of an airplane). While the base may have a height and major diameter that are approximately equal, it is also contemplated that the height be significantly longer, e.g., four times the width or major diameter of the base. (Although described as structural components, the components need not be constructed separately and then assembled, but as noted below, the components can be made—for example, molded—together at the same time.)

Example 1

Turbine Rotor with Frustoconical Base

Figure 2:
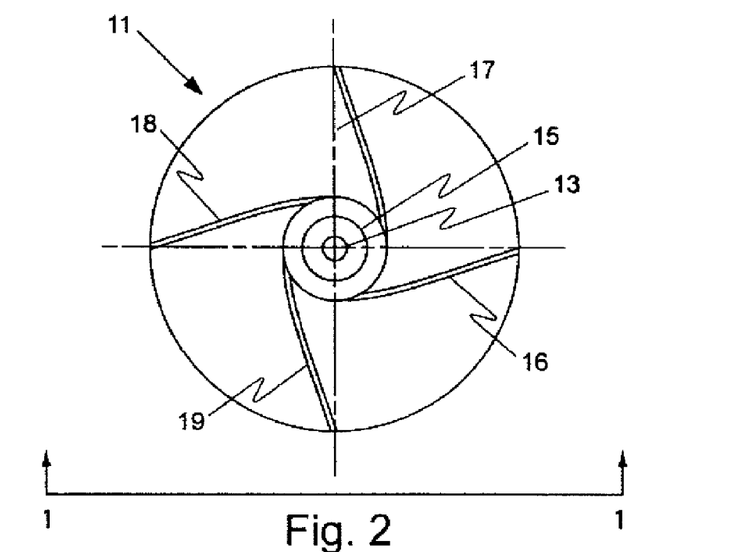
FIG. 2 is a top view of the turbine rotor base of FIG. 1, as viewed from line 2-2 of FIG. 1.

A frustoconical base with slots for inserting turbine blades is illustrated in FIGS. 1 and 2, wherein FIG. 1 is a right-side, left-side, front or back view (in the example shown, all are identical) of the frustoconical base, as viewed from line 1-1 of FIG. 2; and FIG. 2 is a top view of the frustoconical base, as viewed from line 2-2 of FIG. 1. The smaller "top" of the base, as shown, is the upstream end of the turbine rotor, from which water flows into contact with the turbine blades; and the larger "bottom" of the base is the downstream end of the turbine rotor, to which water flows after it has helped turn the turbine rotor. (The terms "top", "bottom" and "side" of the turbine rotor are for relative reference only, as the most likely configurations for the turbine rotor in use will be for the "top" and "bottom" to be at about the same level, i.e., the centerline shown vertically in FIG. 1 will usually be approximately horizontal in use.)

Figure 3:
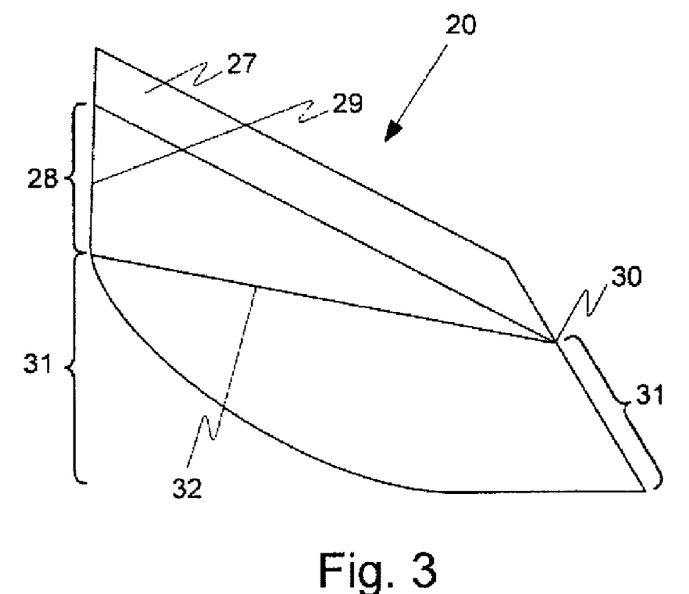
FIGS. 3 and 4 are examples of shapes for turbine blades for a turbine rotor in accordance with the invention.
Figure 4:
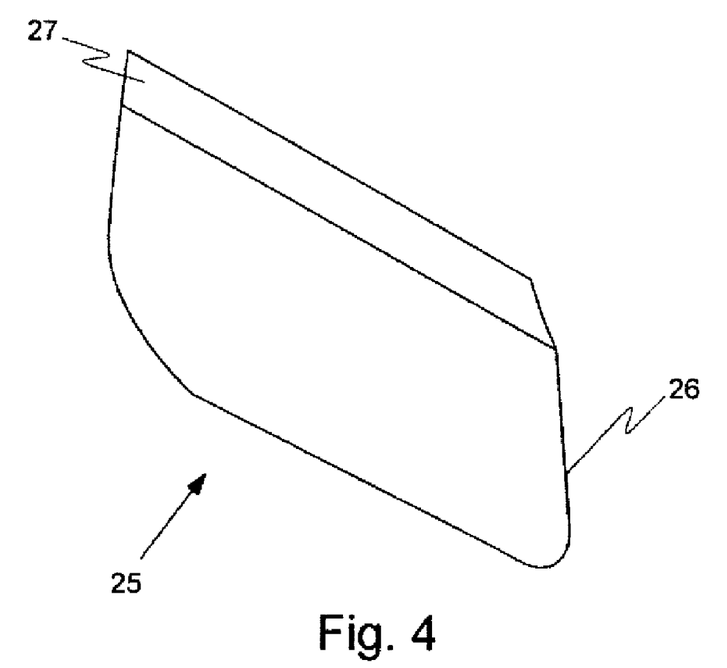

Two examples of shapes of the turbine blades are illustrated in FIGS. 3 and 4.

Figure 5:
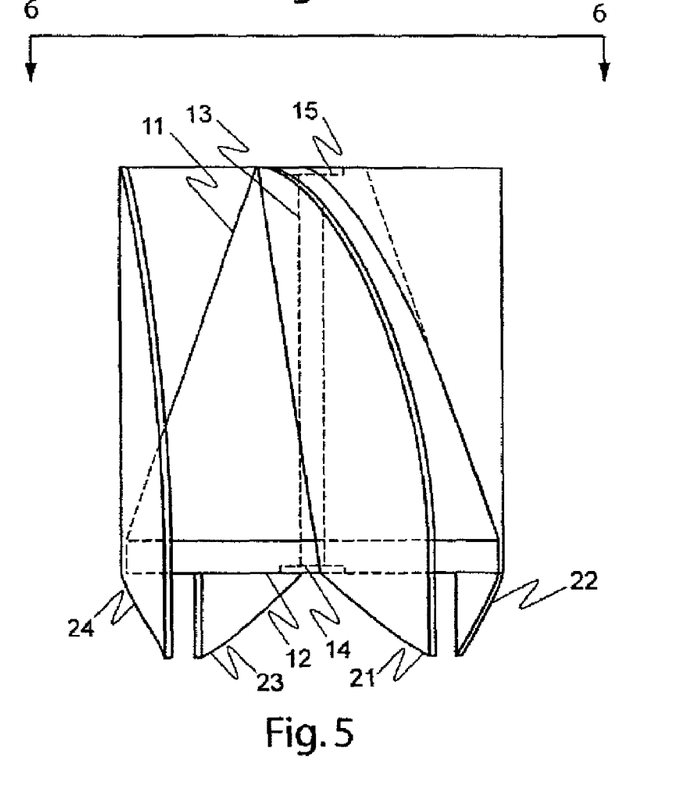
FIG. 5 is a right-side, left-side, front or back view of an assembled turbine rotor in accordance with the invention, at rest, comprising a turbine rotor base and turbine blades that protrude from the sides of the base, as viewed from line 5-5 of FIG. 6.
Figure 6:
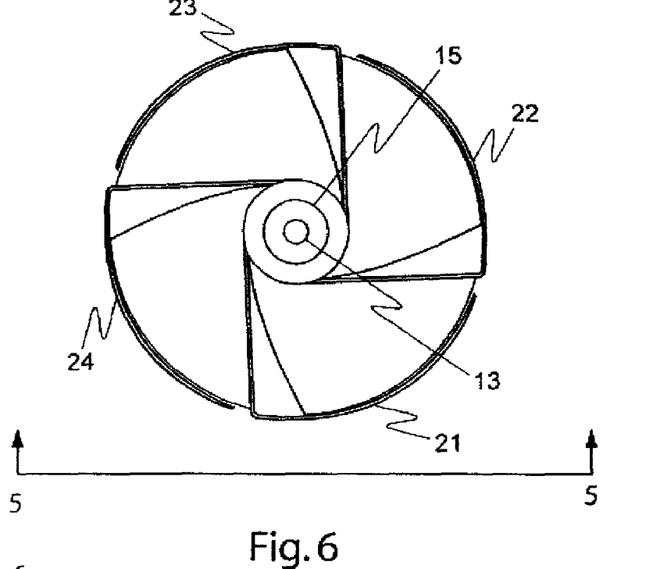
FIG. 6 is a top view of the turbine rotor of FIG. 5, at rest, as viewed from line 6-6 of FIG. 5.

The assembled turbine rotor is illustrated at rest in FIGS. 5 and 6, wherein FIG. 5 is a right-side, left-side, front or back view of the assembled turbine rotor; and FIG. 6 is a top view of the assembled turbine rotor, as shown in FIG. 5.

Figure 7:
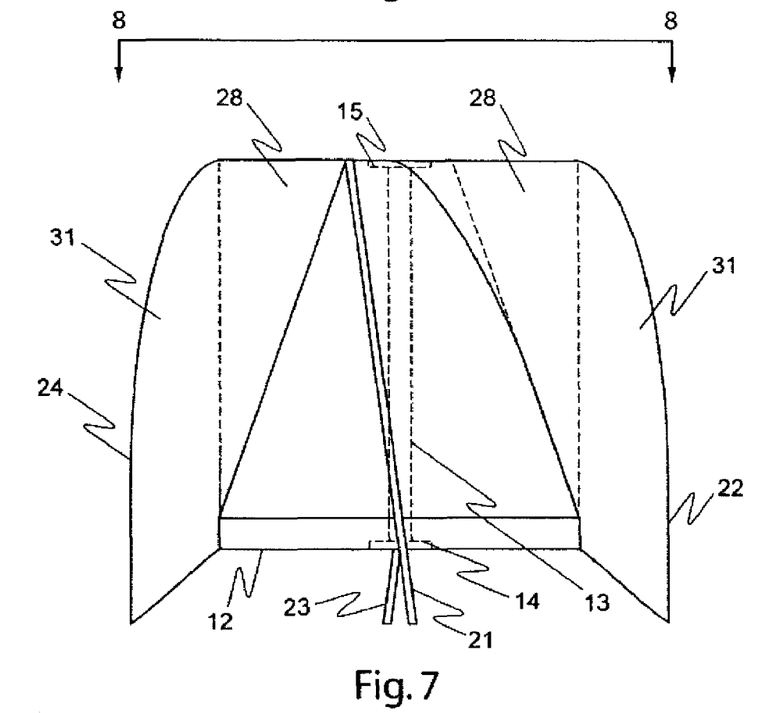
FIG. 7 is a right-side, left-side, front or back view of an assembled turbine rotor in accordance with the invention, in use, comprising a turbine rotor base and turbine blades that protrude from the sides of the base, as viewed from line 7-7 of FIG. 8.
Figure 8:
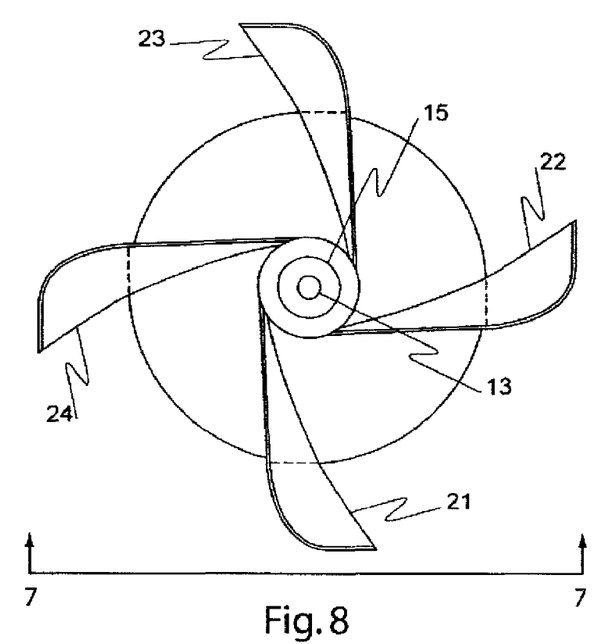
FIG. 8 is a top view of the turbine rotor of FIG. 7, in use, as viewed from line 8-8 of FIG. 7.

The assembled turbine rotor is illustrated in use in FIGS. 7 and 8, wherein FIG. 7 is a right-side, left-side, front or back view of the assembled turbine rotor; and FIG. 8 is a top view of the assembled turbine rotor, as shown in FIG. 8.

The base 11 can be cast or machined from hard rubber, or molded from suitable plastic materials. It can be pre-constructed as a component and assembled with the turbine blades to form the complete turbine rotor, or the frustoconical base and the turbine blades can be molded together as a unit.

The base 11 preferably has a short cylindrical portion 12 at the downstream end of the base, to offer greater strength than if the base terminated in a sharp angle. The base 11 may be as small as three inches in length and three inches in large-end diameter, or as large as several feet for each dimension. The base 11 preferably has approximately the same length and large-end diameter, resulting in upper conic angles "<B" of about 15 to 25 degrees, and lower conic angles "<A" of about 65 to 75 degrees. The base 11 preferably has a central bore 13 through the base (vertical as shown in FIG. 1) to accommodate a shaft. The base 11 preferably has insets 14, 15 to accommodate washers. The base 11 preferably has a series of slots (four, for the embodiment shown in FIGS. 1 and 2) 16 (FIGS. 1 and 2), 17 and 18 (FIG. 2 only) and 19 (FIGS. 1 and 2), to accommodate as many turbine blades 21, 22, 23 and 24 (see FIGS. 5-8, not shown in FIGS. 1 and 2). The turbine blades (and hence the turbine blade slots 16-19) are spaced approximately equally about the base so as to provide a blade surface for substantially each portion of the cross-section of the base that is exposed to the passage of water. For example, in the turbine rotor base and turbine rotor illustrated in FIGS. 1, 2 and 5-8, there are four slots 16-19 and four turbine blades 21-24, each blade covering one fourth of the area of the cross-section of the base that is exposed to the passage of water. Alternatively, there could be six (or 12 or 24, etc.) slots and six (or 12 or 24, etc.) turbine blades, each blade covering one sixth (or $\frac{1}{12}$ or $\frac{1}{24}$, etc.) of the area of the cross-section of the base that is exposed to the passage of water, depending on the size of the turbine rotor.

A preferred profile 20 of each blade 21-24 (but the device is not limited to such a profile) is shown in FIG. 3. An alternate profile 25 of each blade 21-24 is shown in FIG. 4, having a trailing portion 26 with a rounded corner, instead of a sharp corner as shown in FIG. 3.

An anchoring portion 27 of each blade 21-24 is embedded in one of slots 16-19. There may be a substantially triangular stiff portion 28 of each blade, as shown in FIG. 3, which projects outward (when the blade is installed in the turbine rotor base 11) from the turbine rotor base 11, the base 29 of the triangular stiff portion 28 being the leading edge facing the upstream water to which the turbine rotor is exposed, and the apex 30 of the triangular stiff portion 28 being the turbine rotor-side corner of the trailing edge facing the downstream water. A flexible portion 31 of each blade extends from the outer edge 32 of the triangular stiff portion 28. The flexible portions 31 are joined to the stiff portions 28 in such a way that the flexible portions 31 are folded in near the downstream end of the base when the turbine rotor is at rest or in gentle water currents, but so that in heavier water currents the flexible portion 31 of each blade extends outward as illustrated in FIGS. 7 and 8. This has the advantage that when the turbine rotor is at rest or in gentle water currents, the turbine rotor has a small cross-section and therefore does not offer much resistance; but in heavier water currents, the flexible portion 31 expands to extend outward as illustrated in FIGS. 7 and 8, offering a larger area for the water current to push against, and therefore captures more energy from the moving water than a turbine rotor with only the triangular stiff portions 28 would.

The turbine blade may also be constructed so that the entire exterior portion of the turbine blade (i.e., excluding the anchoring portion 27) is flexible. This is the preferred construction of the turbine blade illustrated in FIG. 4.

The turbine rotor blades 21, 22, 23 and 24 can be formed as part of the turbine rotor at the same time as forming the base 11, of essentially the same materials (optionally reinforced with stiffening members in substantially triangular stiff portions 28) as the base 11; or they can be formed of another material and the blades 21-24 and base 11 assembled to form the entire turbine rotor. If formed separately, the blades 21-24 can for example be formed of polyurethane film, heated to form a fold between the substantially triangular stiff portions 28 and flexible portions 31. If the blades 21-24 are formed of polyurethane film, polyurethane resin can be applied behind the substantially triangular stiff portions 28 to aid rigidity and smooth the transition between the base 11 and the blades 21-24. If formed integrally with the base 11, the same material as the base 11 and the blades 21-24 can be provided behind the substantially triangular stiff portions 28 to aid rigidity and smooth the transition between the base 11 and the blades 21-24.

In turbine rotors larger than about 30 inches in diameter, a hinge system may be added at the edge 32 of the triangular portion 28. In smaller turbine rotors, the polyurethane can be cast to form an angle, or cast flat and heated to allow the polyurethane to be bent at an angle. In either case, edge 32 is the location of a pivot to allow the outer portion of the blade to expand outwardly as the water flows past the turbine blade.

Example 2

Turbine Rotor with Smooth Dome-Shaped Base

Figure 9:
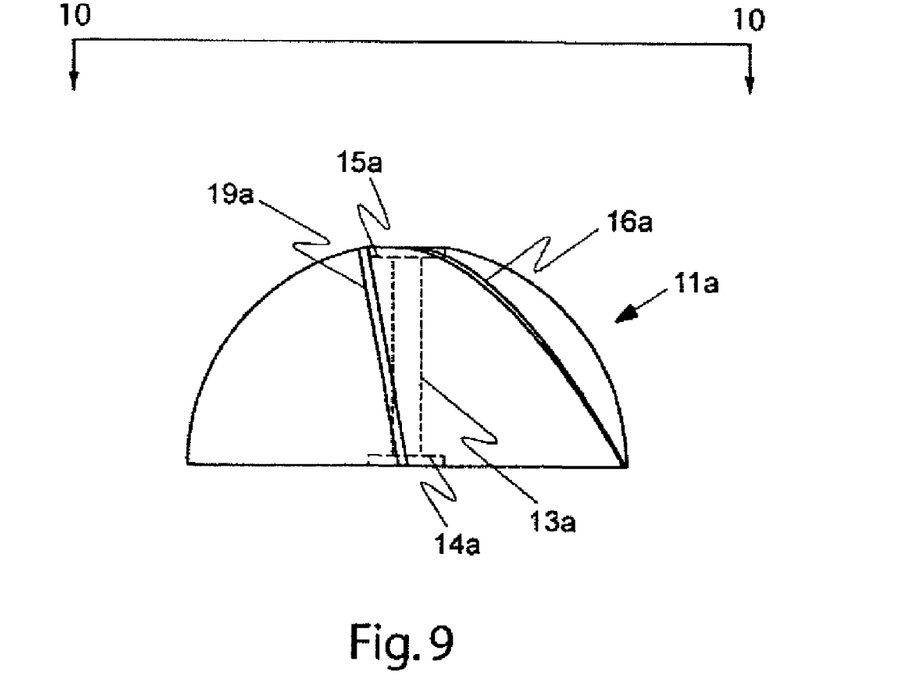
FIG. 9 is a right-side, left-side, front or back view of an example turbine rotor with a smooth dome-shaped base in accordance with the invention, as viewed from line 9-9 of FIG. 10.
Figure 10:
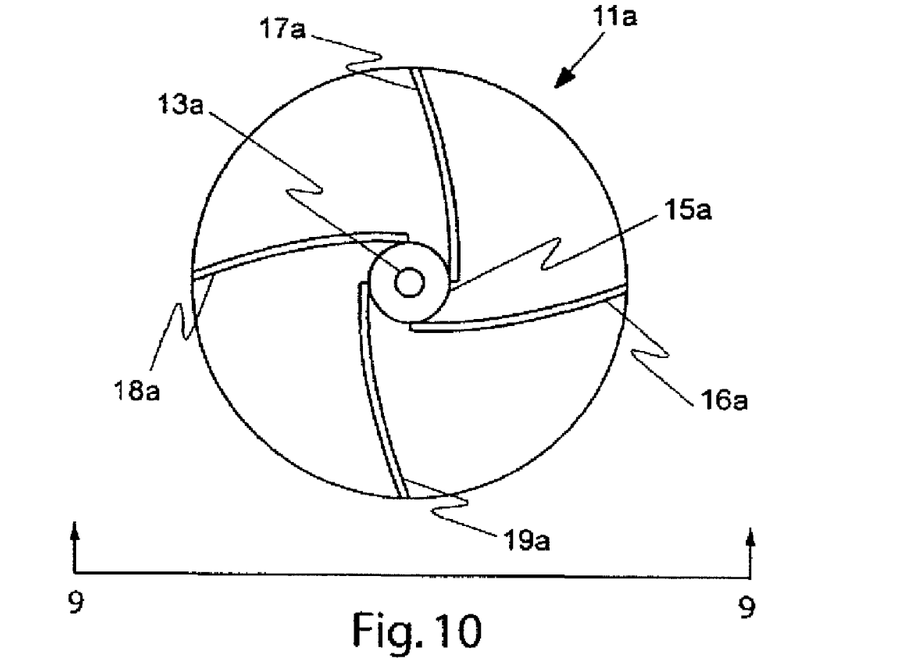
FIG. 10 is a top view of the turbine rotor of FIG. 9, as viewed from line 10-10 of FIG. 9.

FIGS. 9 and 10 illustrate a turbine rotor with a smooth dome-shaped base. Base 11a has the shape of a hemisphere, but functions the same as base 11 in FIGS. 1 and 2. Central bore 13a, insets 14a and 15a, and slots 16a, 17a, 18a and 19a function the same as central bore 13, insets 14 and 15, and slots 16, 17, 18 and 19 in FIGS. 1 and 2. Instead of providing slots 16a, 17a, 18a and 19a, turbine blades (not shown in FIGS. 9 and 10) can be molded integral with base 11a.

Example 3

Turbine Rotor with Pointed Dome-Shaped Base

Figure 11:
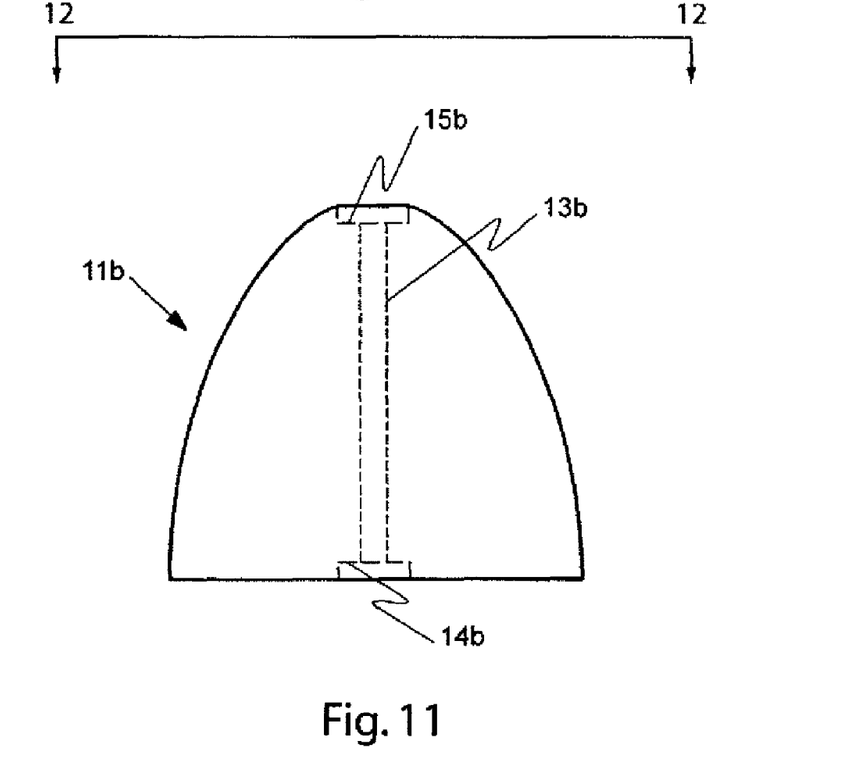
FIG. 11 is a right-side, left-side, front or back view of an example turbine rotor with a pointed dome-shaped base in accordance with the invention, as viewed from line 11-11 of FIG. 12.
Figure 12:
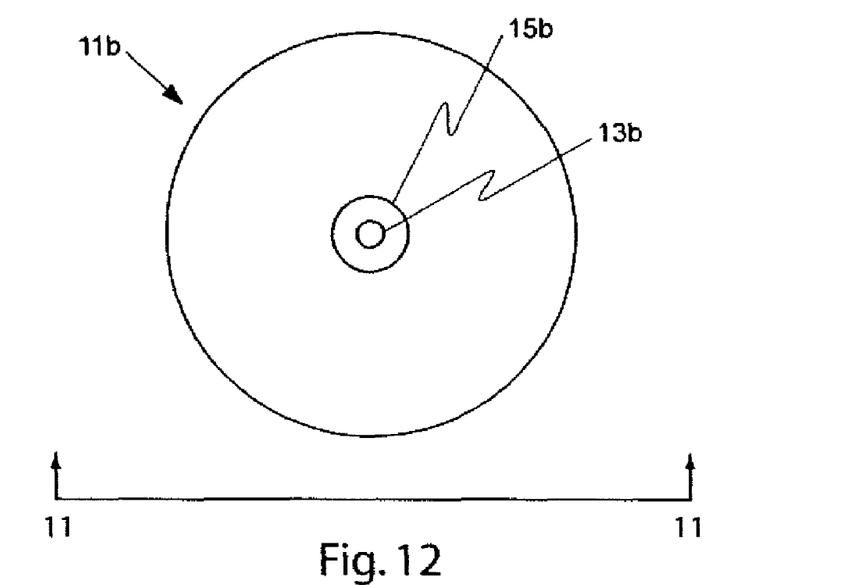
FIG. 12 is a top view of the turbine rotor of FIG. 11, as viewed from line 12-12 of FIG. 11.

FIGS. 11 and 12 illustrate a turbine rotor with a pointed dome-shaped base. Base 11b has the shape of a pointed dome, but functions the same as base 11 in FIGS. 1 and 2. Central bore 13b and insets 14b and 15b function the same as central bore 13 and insets 14 and 15 in FIGS. 1 and 2. Slots can be provided similar to slots 16, 17, 18 and 19 in FIGS. 1 and 2, or turbine blades (not shown in FIGS. 11 and 12) can be molded integral with base 11b.

Example 4

Turbine Rotor with Long Conical Base

Figure 13:
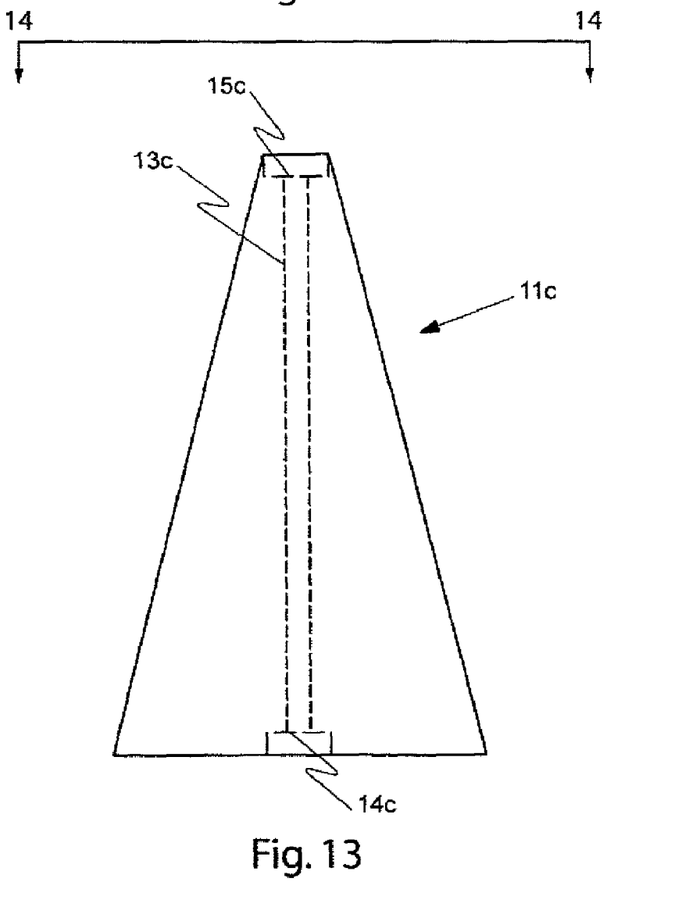
FIG. 13 is a right-side, left-side, front or back view of an example turbine rotor with a long conical base in accordance with the invention, as viewed from line 13-13 of FIG. 14.
Figure 14:
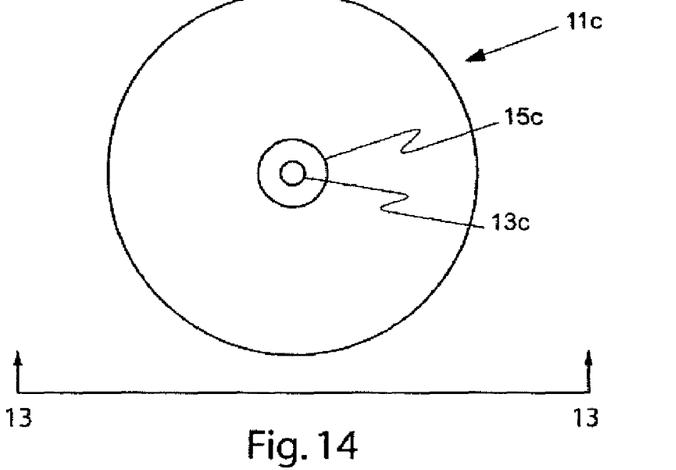
FIG. 14 is a top view of the turbine rotor of FIG. 13, as viewed from line 14-14 of FIG. 13.
Figure 15:
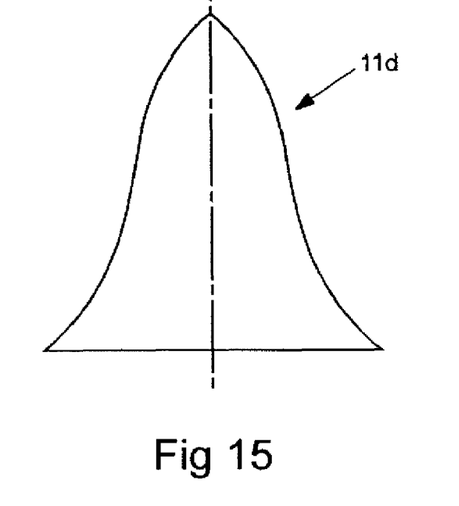
FIGS. 15-18 are variations of cross-sections of turbine rotor bases that can be used in the present invention.
Figure 16:
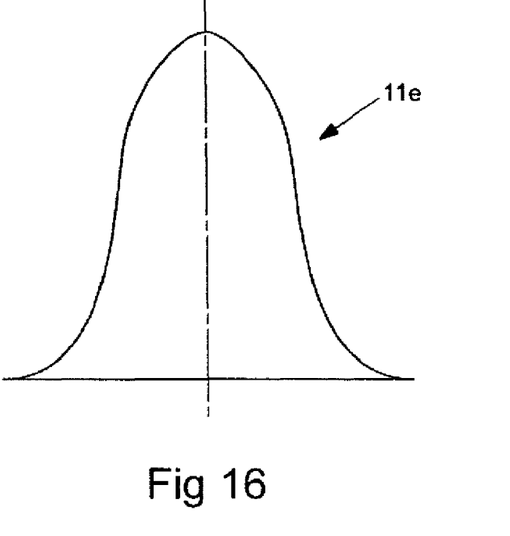
Figure 17:
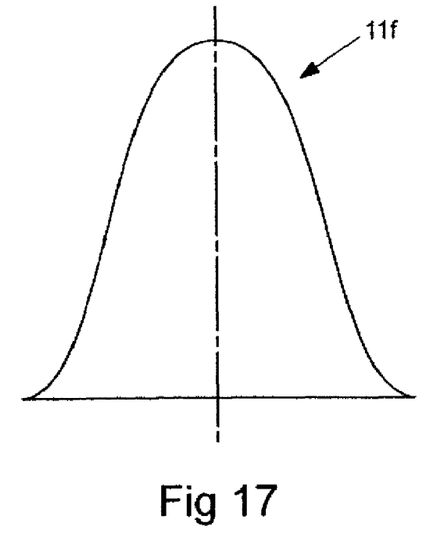
Figure 18:
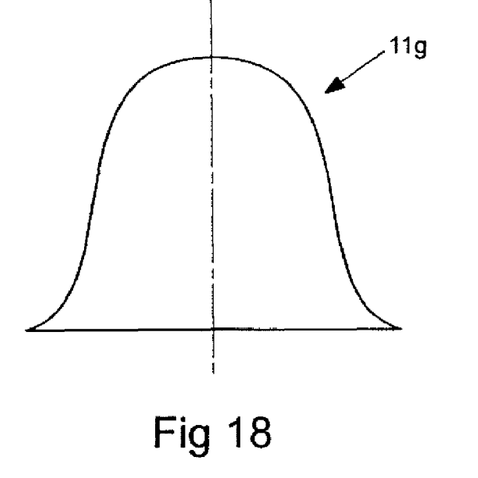

FIGS. 13 and 14 illustrate a turbine rotor with a long conical base. Base 11c has the shape of a long conical base, but functions the same as base 11 in FIGS. 1 and 2. Central bore 13c and insets 14c and 15c function the same as central bore 13 and insets 14 and 15 in FIGS. 1 and 2. Slots can be provided similar to slots 16, 17, 18 and 19 in FIGS. 1 and 2, or turbine blades (not shown in FIGS. 11 and 12) can be molded integral with base 11c.

Examples 5-8

Turbine Rotor with Various Cross-Sections

FIGS. 15-18 illustrate turbine rotors with bases 11d, 11e, 11f and 11g, respectively, with various cross-sections.

Each of the shapes illustrated in FIGS. 9-18 can be provided with short cylindrical portions similar to portion 12 in FIGS. 1, 5 and 7.

Other variations of the devices described above may be employed. For example, the turbine blades 21-24 can be of constant thickness, or they can become narrower toward the end of the trailing edges of the blades. They can be mounted in the base 11 straight, as illustrated in FIGS. 1, 2 and 6-10, or they can be curved so as to be more aerodynamic, e.g., the slots 16-19 can be curved so as to align the blades parallel to the direction of fluid flow at the upstream end of the turbine blades 21-24, and to position the blades at an increasing angle to the direction of fluid flow as the distance downstream increases. The turbine blades 21-24 can end at the base of the frustoconical portion of the base 11, or they can extend to the bottom of the cylindrical portion 12, as shown in FIG. 7, or beyond.

I claim:

1. A turbine rotor for electrical power generation from moving fluid, comprising:
    (a) a turbine rotor base, having a central axis, an upstream end and a downstream end, the turbine rotor base having cross-sections in planes perpendicular to the central axis that are generally circular, the turbine rotor base having a major portion in which the cross-sections perpendicular to the central axis increase in size from the upstream end of the turbine rotor base to the downstream end of the turbine rotor base, the turbine rotor base further being rotatably mountable on an axial shaft; and
    (b) turbine blades that protrude from the sides of the base, the turbine blades including flexible portions;
    wherein the turbine blades have stiff portions that protrude directly from the sides of the base, and to which the turbine blade flexible portions are attached; and
    wherein the turbine blade stiff portions that protrude from the sides of the base each have a shape that is wider at the upstream end of the turbine rotor base than at the downstream end of the turbine rotor base.

2. A turbine rotor according to claim 1, wherein the turbine blade stiff portions that protrude from the sides of the base each have a shape that includes an approximately straight edge that is approximately equidistant from the axis of the turbine rotor base.

3. A turbine rotor according to claim 2, wherein the turbine blade flexible portions are attached to the approximately straight edges that are approximately equidistant from the axis of the turbine rotor base.

* * * * *